(12) United States Patent
Rahman et al.

(10) Patent No.: US 8,315,613 B1
(45) Date of Patent: Nov. 20, 2012

(54) ASSISTING A USER TO STORE AND PLACE A CALL BACK TO RECEIVED INTERNATIONAL NUMBER

(75) Inventors: Iftekhar Rahman, Billerica, MA (US); Kika Konstantinou, New York, NY (US)

(73) Assignee: Cellco Partnership, Basking Ridge, NJ (US)

( * ) Notice: Subject to any disclaimer, the term of this patent is extended or adjusted under 35 U.S.C. 154(b) by 128 days.

(21) Appl. No.: 12/889,076

(22) Filed: Sep. 23, 2010

(51) Int. Cl.
*H04W 88/02* (2009.01)

(52) U.S. Cl. .................................. 455/415; 455/404.2

(58) Field of Classification Search .................. 455/415, 455/404.2, 445, 558, 564
See application file for complete search history.

(56) References Cited

U.S. PATENT DOCUMENTS

| | | | | |
|---|---|---|---|---|
| 2006/0276226 | A1* | 12/2006 | Jiang | 455/558 |
| 2009/0124291 | A1* | 5/2009 | Cha | 455/564 |
| 2009/0149220 | A1 | 6/2009 | Camilleri et al. | |
| 2009/0279683 | A1* | 11/2009 | Gisby et al. | 379/201.02 |
| 2010/0322400 | A1* | 12/2010 | Katzenstein | 379/114.21 |
| 2011/0070890 | A1* | 3/2011 | Wu | 455/445 |

OTHER PUBLICATIONS

"Telephone numbers in Europe," Sep. 22, 2010 en.wikipedia.org/wiki/Telephone_numbers_in_Europe>.
"List of country calling codes," Sep. 22, 2010 //en.wikipedia.org/wiki/List_of_country_calling_codes>.
"Telephone numbering plan" Sep. 22, 2010 ://en.wikipedia.org/wiki/Telephone_numbering_plan>.
"List of international call prefixes," Sep. 22, 2010 //en.wikipedia.org/wiki/List_of_international_call_prefixes>.
Complete Application history of U.S. Appl. No. 12/889,093, filed Sep. 23, 2010 entitled Automating Emergency Calls Globally.
Complete Application history of U.S. Appl. No. 12/562,680, filed Sep. 18, 2009 entitled Enabling and Asisted Dialing on a Mobile Device.
Complete Application history U.S. Appl. No. 12/636,240, filed Dec. 11, 2009 entitled Determining Mobile Station Operating Country to Enable System Selection or Other Location Based Device Features Without Network Assistance.

* cited by examiner

*Primary Examiner* — Diane Mizrah

(57) ABSTRACT

When a mobile device receives an incoming call from a telephone number: it identifies a number of digits associated with the telephone number and determines whether the number of digits exceeds a threshold. Upon determining that the number of digits exceeds the threshold, the incoming call is identified as an international call and the telephone number is identified as an international telephone number. The mobile device identifies a reference country from which the international call is originated and stores the international telephone number in association with the reference country in its memory.

19 Claims, 5 Drawing Sheets ary population. Mobile service provided through public cellular or Persona Communication Service ("PCS") type networks, particularly for voice telephone service, has become virtually ubiquitous across much of the world.

ASSISTING A USER TO STORE AND PLACE A CALL BACK TO RECEIVED INTERNATIONAL NUMBER

TECHNICAL FIELD

The present discussion relates to technologies for assisting a user to store and place a call back to a received international number.

BACKGROUND

In recent years, use of mobile communications devices for voice telephone services, e-mail or text messaging services and even multi-media services has become commonplace, among mobile professionals and throughout the more general consumer population. Mobile service provided through public cellular or Persona Communication Service ("PCS") type networks, particularly for voice telephone service, has become virtually ubiquitous across much of the world.

A user of the mobile device usually enters a telephone number into the mobile device or retrieves a number from a contact list stored in the device to initiate a call or a message transmission to a particular destination. Today, mobile stations often capture a callers' number from the caller ID data for an incoming call. The caller's number maybe used for a return call or added to the contact list.

Dialing patterns are country specific and apply whether the user is dialing from a mobile device or from a landline. The number of digits in a telephone number may also vary between countries. As such, it is important for the mobile user to dial or select a destination number in a correct dialing pattern as the mobile user roams from one country to another country.

For example, if the mobile user has its home network in United States and wishes to reach another subscriber within the same home network, the user may enter the National Direct Dial ("NDD") code of the United States (e.g., 1) followed by the phone number of the other user. For another example, if the same mobile user wishes to reach another subscriber within the network of another country, the user may have to dial the International Direct Dial ("IDD") code (e.g., 011) of the United States followed by the country code associated with the other user and the telephone number of the user. As such, as mobile users roam into different networks, they need to be continuously aware of the IDD code of the country in which they are located and the relevant country codes.

Similarly, for placing a return call to a received international number, the user will have to separate a prefix consisting of an international call indicator, a country code and a city code from the calling party number and then manually key in the IDD, the country code, the city code and the calling party number in order for the return call to be properly handled by the network. However, as the user roams between countries, the captured numbers may not be in proper form for call back.

To illustrate, when a call is received on a wireless handset, the calling party number is automatically stored in a special memory space in the handset. This memory space is visible to the handset user through a special feature, usually called "Received Calls." The received calls are visible to the user when a special window is invoked by the user through the "Received Calls" graphical user interface. This is usually a read or execute interface. The Execute interface provides a call back functionality whereby the user can select a particular calling party number and then indicate to the device to place a call to that number. For a call in the user's home country, for example, the call will be placed properly if the network is not busy and the calling party number and the place at which the call was received are in the same country. Unfortunately, if the original call is placed from one country and the call is received in another country, then the return call back will not go through. The number from the recent call list will not include all the necessary data. To place the return call properly, the user will have to separate a prefix consisting of an international call indicator, a country code and a city code from the calling party number and then manually key in the IDD, the country code, the city code and the calling party number in order for the return call to be properly handled by the network.

Therefore, there is need for a method that automates the manual effort that would otherwise be required of the user for international call backs. The instant application describes such method.

SUMMARY

In one general aspect, a method is disclosed for assisting a user to store a received international number. The method includes steps of receiving, at a mobile device, an incoming call from a telephone number; identifying, at the mobile device, a number of digits associated with the telephone number; and determining, at the mobile device, whether the number of digits exceeds a threshold. Upon determining that the number of digits exceeds the threshold, the incoming call is identified as an international call and the telephone number is identified as an international telephone number. The method also includes steps of identifying a reference country from which the international call originated; and storing, at the mobile device and in a memory space for received call numbers, the international telephone number in association with the reference country.

The above general aspect may include one or more of the following features. For example, determining whether the number of digits exceeds the threshold may include determining whether the number of digits exceeds 10 digits. The method may further include steps of identifying a country of operation of the mobile device at a time of receiving the international call; and determining the number of digits associated with telephone numbers originating from the country of operation. The threshold may include the number of digits associated with the numbers originating from the country of operation. The country of operation may be the United States and the threshold may be 10 digits.

Identifying the country of operation may include identifying a country of operation utilizing a Global Positioning System ("GPS"). Identifying the reference country may include referencing a table listing country codes associated with different countries to identify a country code corresponding to the first n digits of the international telephone number, and identifying the reference country associated with the country code corresponding to the first n digits of the international telephone number. The table may be downloaded to the mobile device via an Over-The-Air service activation/provisioning Function ("OTAF") server and may be updated in the mobile device via the OTAF server. Storing the international telephone number includes storing the reference country and the international telephone number without its corresponding country code in the memory space.

The method may further involve receiving, from a user of the mobile device, a selection of a telephone number from among telephone numbers stored in the memory space. The telephone number may be the international number. A country of operation of the mobile device is identified at the time of receiving the selection from the user. If the country of operation is the same as the reference country associated with the international number, the mobile device automatically transmits the international number as stored in the memory to a wireless network servicing the mobile device in the country of operation. However, if the country of operation is different from the reference country, the mobile device automatically identifies an IDD code associated with the country of operation, automatically modifies the international number to include the identified IDD code and automatically transmits the modified international number to the wireless network servicing the mobile device in the country of operation.

The methodology may also address country issues where the call is not international when received but the user may roam to another country and want to make an international call back to the original caller. For example, when the mobile device, receives another incoming call from another telephone number, it identifies the number of digits associated with the other telephone number and determines whether the number of digits associated with the other telephone number exceeds a threshold. Upon determining that the number of digits associated with the other telephone number does not exceed the threshold, the mobile device identifies the other incoming call as an intra-national call and identifies the other telephone number as an intra-national telephone number, the mobile device identifies a country of operation of the mobile device at the time of receiving the intra-national incoming call and stores the intra-national telephone number in association with the country of operation as a reference country from which the intra-national call originates, in the memory space for received call numbers.

Implementations of the described techniques may include hardware, such as an appropriately configured mobile device, a method or process, or software for a mobile device on a computer-accessible medium.

The details of one or more implementations are set forth in the accompanying drawings and the description below. Other features will be apparent from the description and drawings, and from the claims.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, a mobile device determines if a received call is an international call or an intra-national call. If an intra-national call, then the mobile device determines the country that the mobile device is in and tags the calling party number ("CPN") as an intra-national number and also tags the CPN with the reference country that the call was received in. If the received call is an international call, the mobile device tags the CPN as an international number and also tags the CPN with a reference country from which the received call was originated. The next time that the user chooses to place a return call to the stored CPN, the device determines whether the call from its then current country of operation is a national or international call, and the call is placed accordingly.

The foregoing method removes the manual effort required of the user for international call backs. It also allows the user to have the device automatically call back the calling party number with a single operation even if the user has moved to another country that is different from the country wherein he or she had received the original incoming call.

Figure 1:
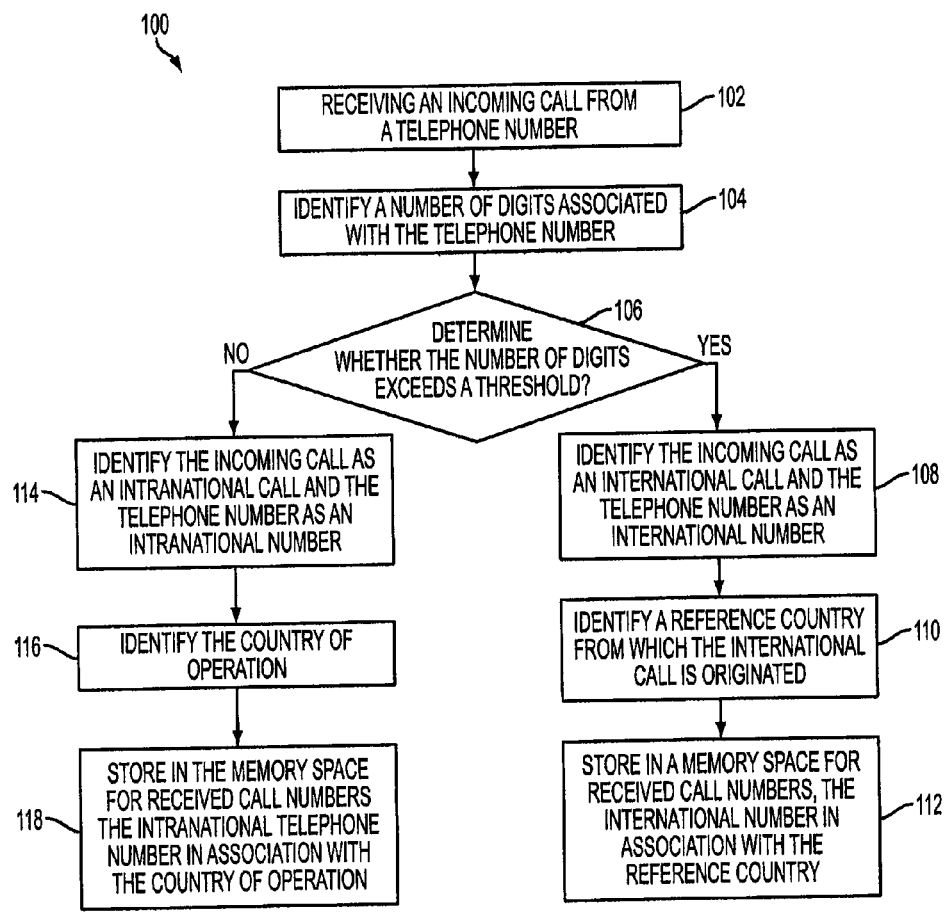
FIG. 1 illustrates an exemplary process for automating storage of calling party numbers, which may include a received international number.

With this overview, reference now is made in detail to the examples illustrated in the accompanying drawings and discussed below. FIG. 1 illustrates an exemplary process 100 for automating storing numbers from incoming calls in a manner to facilitate an automated call back to an international number. The call back process is described later, with respect to FIG. 2. The process 100 may begin with the mobile device receiving an incoming call from a telephone number (Step 102). The mobile device may receive an incoming call from another mobile device located within a country of operation of the mobile device. Alternatively, the mobile device may receive an incoming call from another mobile device located outside the country of operation of the mobile device, i.e. an international call. The country of operation may include a country in which the mobile device is located at the time of receiving the incoming call.

Assuming that the country of operation for the mobile device is the United States, then the received calls depending from their origin may appear differently in the received call list on the mobile device. For example, incoming calls originating from within the United States may appear on the received call list as having 10 digits telephone numbers; whereas, calls originating from outside of the United states may appear on the received call list as having more than 10 digits. This is because the calls originating from outside of the United States will consist of a country code and a city code followed by the telephone number.

The techniques disclosed here recognize this fact and utilize it to distinguish the international calls from the intra-national calls appearing in the received call list on the mobile device. In particular, after receiving the incoming call, the mobile device identifies a number of digits associated with the telephone number of the incoming call (Step 104). Then, the mobile device determines whether the number of digits exceeds a threshold (Step 106). The threshold corresponds to the number of digits associated with the numbers originating from the country of operation.

In one implementation, the mobile device may be set to a specific country of operation. In keeping with the previous example, if the user's home network is the United States, the mobile device may be set to recognize the United States as the country of operation. In this scenario, once the call is received, the mobile device determines whether the number of digits associated with the incoming call exceeds 10. If so, the mobile device may tag the incoming telephone number as an international number among the numbers appearing in the received call list. If not, the mobile device may tag the incoming telephone number as an intra-national number among the numbers appearing in the received call list. If the mobile device moves outside of the United States, the country of operation of the mobile device may be manually changed by the user to ensure proper operation for the new operating location of the mobile device.

In another implementation, the mobile device may identify the country of operation based on the location of the mobile device at the time the incoming call is received. In this scenario, the country of operation may not be manually set in the mobile device and the mobile device may dynamically change the country of operation as it roams from one country to another country. To enable such functionality, the mobile device may utilize a Global Positioning System ("GPS"). However, the mobile device may use other methods to identify the country of operation as discussed in U.S. patent application Ser. No. 12/636,240, the entire content of which is incorporated herein by reference. In keeping with the previous example, utilizing the GPS, the mobile device may determine that it is operating within the United States and determine the number of digits (e.g., 10) associated with the telephone numbers originating from the United States. Then, the mobile device sets the threshold against which the number of digits for the received calls is compared to 10 digits.

Moving forward, if the number of digits associated with the telephone number of the incoming call exceeds the threshold (Step 106, Yes), the mobile device identifies the incoming call as an international call and identifies the telephone number as an international number (Step 108). The mobile device then may identify a reference country from which the international number is originated (Step 110). To do so, the mobile device may reference a table listing country codes associated with different countries to identify a country code corresponding to the first n digits of the international telephone number. An example of such a table may be on the Internet on Wikipedia at wiki entries for "list of country calling codes," "telephone numbers in Europe," and/or "telephone numbering plan."

The mobile device identifies the reference country associated with the country code corresponding to the digits of the international telephone number. For example, if the received international telephone number begins with 46, then by reference the table, the mobile device recognizes that the international telephone number is originating from Sweden. As another example, if the received international telephone number begins with 34, the mobile device recognizes that the international telephone number is originating from Spain.

In either case, once the mobile device determines the reference country, the mobile device stores the international number in association with its reference country in a memory space for the received call numbers (Step 112). The mobile device may store the international telephone number without the first n digits corresponding to the country code that was matched to the country code of the reference country in the memory space that is reserved for received call numbers. The mobile device may also identify the city code associated with the international telephone number. In one example, based on the country code, the mobile device may identify the city codes associated with the country and compare the identified city codes with the next m digits of the international number. The mobile device may store in the memory space that is reserved for the received call numbers, the CPN separate from the country code and the city code. Alternatively, the mobile device may store in the memory space that is reserved for the received call numbers the country code separate from the remaining numbers in the international telephone number.

If the number of digits associated with the telephone number of the incoming call does not exceed the threshold (Step 106, No), the mobile device identifies the incoming call as an intra-national call and identifies the telephone number as an intra-national number (Step 114). The mobile device identifies the country of operation that the device is located or operating in when it received the call from this particular telephone number (Step 116). The mobile device then stores the intra-national telephone number in association with the country of operation (Step 118) in the memory space for the received call numbers. In this scenario, the country of operation acts as the reference country for the intra-national number. In this way, each type of number is stored in a form for non-international call back but with sufficient data to convert to the proper form if the call is international at the time of call back.

Figure 2:
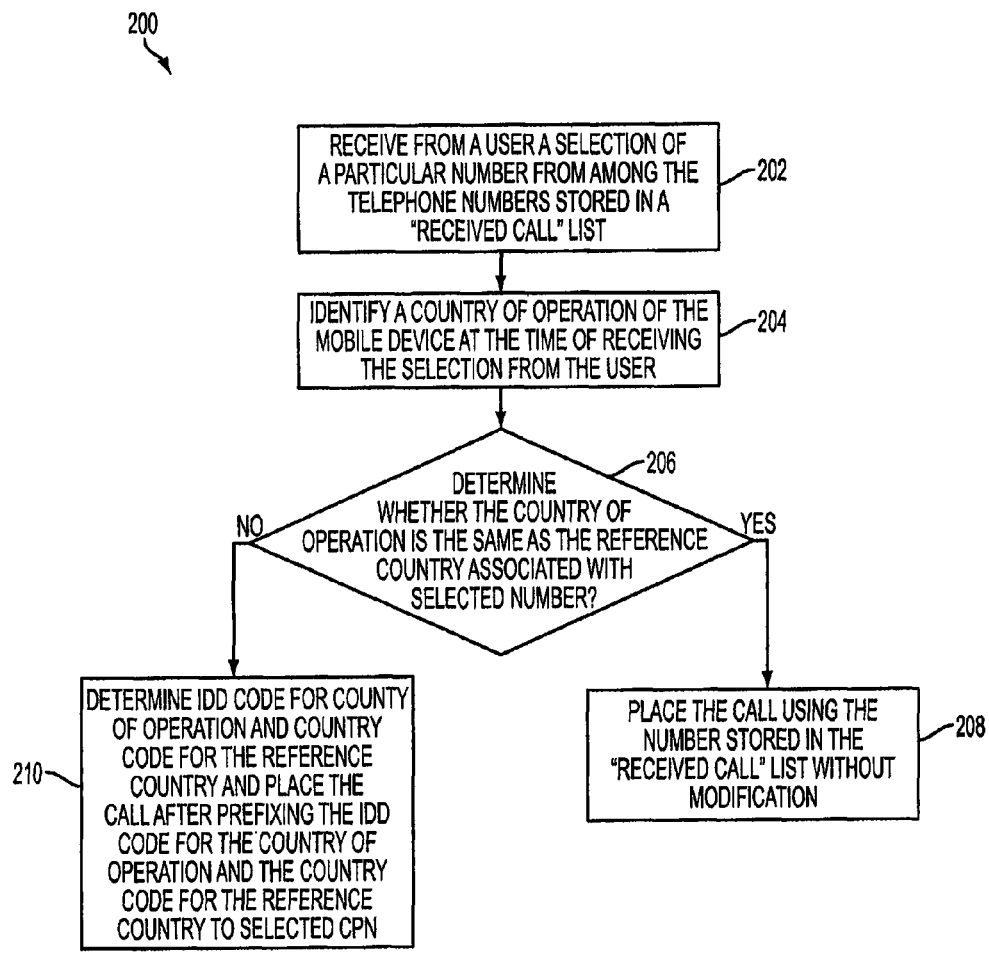
FIG. 2 illustrates an exemplary process 200 for determining how to place a call to a number stored in a "Received Call" list.

FIG. 2 illustrates an exemplary process 200 for determining how to place a call to a number stored in a "Received Call" list. A similar procedure could apply to a selection from a contact list or from any other type of call list stored in the device. The process 200 begins with the user selecting a particular number from among the telephone numbers stored in the "Received Call" list (Step 202). The telephone numbers may be stored in the "Received Call" list in a manner described with respect to FIG. 1.

The selection of the number may be through a manual input from the user. To illustrate, the "Received Call" list may be visible to the handset user when a special window is invoked by the user through the "Received Calls" graphical user interface. This is usually a Read or Execute interface. The Execute interface provides a call back functionality whereby the user can select a particular number and then indicate to the device to place a call to that number.

The mobile device identifies the country of operation of the mobile device at the time of receiving the selection from the user (Step 204). The mobile device then determines whether the country of operation is the same as the reference country associated with the selected number (Step 206). If the mobile device is operating in the same country as the reference country tag for the selected number (Step 206, Yes), the mobile device then places the call using the same number that is stored in "Received Calls" list without modifying the number (Step 208). If, however, the mobile device is operating in a different country that the reference country tag for the selected number (Step 206, No), the mobile device first determines IDD code for the country of operation and the country code for the reference country and places the call after prefixing the IDD code for the country of operation and the country code for the reference country to the selected number (Step 210). In this example, it is assumed that the selected number is stored as CPN plus the city code. In another example, where the CPN is stored separate from the country code and the city code, the mobile device identifies the city code in addition to the country code and the IDD code and modifies the CPN to include the country code and the IDD code before transmitting it to the mobile service provider servicing the mobile device.

Figure 3:
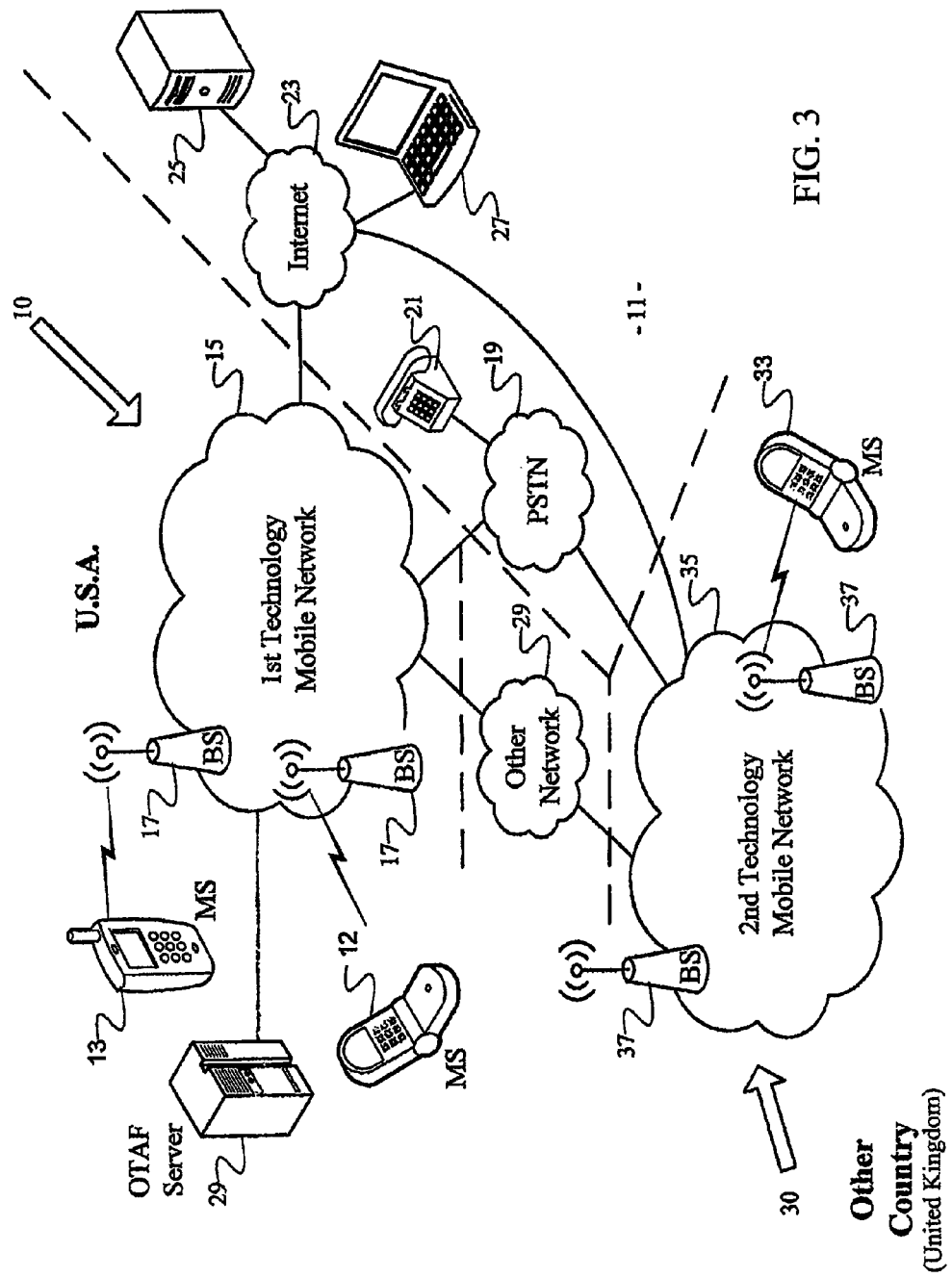
FIG. 3 is a functional block diagram of an exemplary system of wireless networks for providing mobile voice telephone services and various data services, useful in explaining a context in which automating a call back to a received international call may be desirable.

FIG. 3 is a functional block diagram of an exemplary system of wireless networks for providing mobile voice telephone services and various data services, useful in explaining a context in which automating a call back to a received international call may be desirable. For discussion purposes, the diagram shows two wireless networks 10 and 30 operated in accord with different technology standards. The networks 10 and 30 often (but not always) may be operated by different providers, carriers or operators. The communication networks 10 and 30 implementing the illustrated system provide mobile voice telephone communications as well as other services such as text messaging and various multimedia packet data services, for numerous mobile devices. For purposes of later discussion three mobile devices 12, 13 and 33 appear in the drawing. The elements indicated by the reference numerals 10 and 30 generally are elements of the respective operator's network, although the mobile devices 12, 13 and 33 typically are sold to the carrier's customers.

Today, mobile devices typically take the form portable handsets, smart-phones or personal digital assistants, data cards for computers, although they may be implemented in other form factors. Each mobile communication network 10 or 30 provides communications between mobile devices 12, 13 and 33 as well as communications for the mobile devices with other networks and stations shown generally at 11 outside the mobile communication networks. An inter-carrier or other intermediate network 29 may provide communication connectivity between the mobile communication networks 10 and 30.

Each network 10, 30 allows users of the mobile devices operating through the respective network to initiate and receive telephone calls to each other as well as through the public switched telephone network ("PSTN") 19 and telephone stations 21 connected thereto. One or both of the networks typically offers a variety of text and other data services, including services via the Internet 23, such as downloads, web browsing, e-mail, etc. via servers shown generally at 25 as well as message communications with terminal devices represented generally by the personal computer 27.

The networks 10 and 30 are generally similar, except in our example, they offer respective services via two different wireless communication technologies. For purposes of an example for discussion here, we will assume that the network 10 is a 3GPP2 (1XRTT and EVDO) technology network, whereas the network 30 is a 3GPP (LTE/GSM/UMTS) technology network. In one implementation, the networks 10, 30 are operated in one country. In another example, the networks 10, 30 are operated in different countries. In one specific example, network 10 is operated in the United States and the network 30 is operated in United Kingdom.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements. A regional portion of the network 10, such as that serving mobile device 13 will typically include one or more RANs and a regional circuit and/or packet switched network and associated signaling network facilities.

Physical elements of a RAN operated by one of the mobile service providers or carriers, include a number of base stations represented in the example by the base stations ("BSs") 17. Although not separately shown, such a base station 17 typically comprises a base transceiver system ("BTS") which communicates via an antennae system at the site of base station and over the airlink with one or more of the mobile devices 13, when the mobile devices are within range. The BTS is the part of the radio network that sends and receives RF signals to/from the mobile devices that the base station currently serves. Hence, in our example, the BTS would utilize 3GPP2 (1XRTT and EVDO) type transceiver equipment and implement communications in accord with the protocols of the applicable 3GPP2 standard, for signaling, registration, voice communication, data communication, etc. For example, each base station 17 will broadcast certain standardized information to allow a mobile device 12 or 13 in the region to search for, find and lock-onto the base station 17 and acquire information needed to register and initiate communications via the network 10, all in accord with the standard 3GPP2 protocols.

The radio access networks also include a traffic network represented generally by the cloud at 15, which carries the user communications for the mobile devices 12, 13 between the base stations 17 and other elements with or through which the mobile devices communicate. Individual elements such as switches and/or routers forming the traffic network 15 are omitted here for simplicity. Although not separately shown, the network 15 will include or connect with a number of service control elements, for authenticating mobile devices to use the network 10, for authenticating mobile device users and/or for authorizing users or devices to access various services and service features offered by the particular network 10, and for usage accounting and billing functions.

The traffic network portion 15 of the mobile communication network 10 connects to a public switched telephone network 19. This allows the network 10 to provide voice grade call connections between mobile devices and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23. Packet switched communications via the traffic network 15 and the Internet 23 may support a variety of user services through the network 10, such as mobile device communications of text and multimedia messages, e-mail, web surfing or browsing, programming and media downloading, etc. For example, the mobile devices may be able to receive messages from and send messages to user terminal devices, such as personal computers, either directly (peer-to-peer) or via various servers 25. The drawing shows one user terminal device as a personal computer ("PC") at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile devices to enable they operation via the network 10. Of note for purposes of the present discussion, one or more such systems provide the capability to download a program for automating emergency calls globally into the mobile devices of the network operator, in this example, via the networks. An example of such a system that may facilitate programming and/or downloading via the networks is the Over-The-Air service activation/provisioning Function ("OTAF") 29. In the example, the OTAF 29 may be a server connected to the traffic network 15, to enable the server to communicate with the mobile devices of the network operator's customer and program the mobile devices for assisting a user to store and place a call back to a received international number.

As noted earlier, many mobile wireless communications networks have been deployed and are available today. For purposes of discussion the example of FIG. 2 shows a second mobile network 30. In our example, the network 30 is operated by a different carrier or service provider than the operator of network 10. In some areas, the second network 30 could utilize the same wireless technology as the network 10, but in our example, the network 30 utilizes a different wireless network technology. The network 10 is a 3GPP2 (1XRTT and EVDO) technology network, and in the example, the network 30 is a 3GPP (LTE/GSM/UMTS) technology network.

Like the network 10, the physical elements of RAN 30 include a number of BSs 37, each of which includes a BTS and associated antenna system. In our example, each BTS of BS 37 would utilize 3GPP (LTE/GSM/UMTS) type transceiver equipment and implement communications in accord with the protocols of the applicable 3GPP standard, for signaling, registration, voice communication, data communication, etc. For example, each BS 37 will broadcast certain standardized information to allow a mobile device 12 or 33 in the region to search for, find and lock-onto the base station 37 and acquire information needed to register and initiate communications via the network 30, all in accord with the standard 3GPP protocols.

The radio access network portions of network 30 also include a traffic network represented generally by the cloud at 35, which carries the user communications for the mobile devices 12, 33 between the base stations 37 and other elements with or through which the mobile devices communicate. Individual elements such as switches and/or routers forming the traffic network 35 are omitted here for simplicity. Although not separately shown, the network 35 will include or connect with a number of service control elements, for authenticating mobile devices to use the network 30, for authenticating mobile device users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile devices and regular telephones 21 connected to the PSTN 19. The traffic network portion 35 of the mobile communication network 30 also connects to a public packet switched data communication network, such as the network commonly referred to as the "Internet" shown at 23, for various mobile device communications with servers 25 and/or user terminal devices 27. Although omitted for simplicity, the network 30 may also include various systems that provide ancillary functions in support of the communications services provided through the network 30, such as a system similar to the OTAF 29 for providing data and/or programming downloads to the mobile devices of the network operator's customers.

The mobile devices 12, 13, and 33 may be configured to determine if a received call is an international call or an intra-national call. If an intra-national call, the mobile device 12, 13, or 33 determines the country that the mobile device is in at the time of receiving the call and tags the CPN as an intra-national number. The mobile device also tags the CPN with the country of operation in which the call was received. If the received call is an international call, the mobile device 12, 13, or 33 determines the reference country from which the international call is originated. The mobile device 12 tags the CPN as an international number and also tags the CPN with the reference country. The mobile device 12 may store the CPN for the international number separated from the city code and the country code in the memory space reserved for the received calls. Alternatively, the mobile device 12 may store the CPN and the city code together but may store the country code separate in the memory space reserved for the received calls.

With this operation, the next time that the user chooses to place a return call to the stored CPN, the device determines whether the call is a national or international call and the call is placed accordingly. To illustrate, assume that the user of the mobile device 12 is operating in the United States when it receives an incoming call from a telephone number associated with the mobile device 13, which is also operating in the United States. Prior to storing the telephone number in the "Received Call" list, the mobile device 12 identifies a number of digits associated with the telephone number, and then, the mobile device determines whether the number of digits exceeds a threshold. The threshold corresponds to the number of digits associated with the numbers originating from the country of operation. In this example, the mobile device determines that its country of operation is the United States by, for example, utilizing a GPS and further determines that the threshold for the United States is 10 digits. Alternatively, the mobile device may be programmed to recognize the reference country as the United States.

Since the mobile device 13 is also operating in the United States, its telephone number does not exceed 10 digits. Thus, the mobile device 12 determines that the telephone number associated with the mobile device 13 is an intra-national number. The mobile device 12 tags the telephone number as an intra-national number; tags the telephone number with the country of operation in which the call was received (e.g., the United States); and stores these information in the "Received Call" list. With this operation, the next time that the user chooses to place a return call to this number by, for example, selecting the number from among the received numbers appearing in the "Received Call" list, the mobile device 12 determines that the number is the United States number by referencing the tag. The mobile device 12 then determines its current country of operating. If it is still the United States, the mobile device 12 places the call using the number stored in the "Received Call" list without modifying it. If, however, the mobile device 12 has roamed outside of the United States, the mobile device 12 first determines IDD code for the country of operation and the country code for the reference country associated with the CPN (e.g., the United States) and places the call after prefixing the IDD code for the country of operation and the country code for the reference country to the stored number. The mobile device may reference a table listing IDD codes associated with different countries to identify an IDD code corresponding to the country of operation. An example of such a table may be on the Internet on Wikipedia at wiki entries for "List of international call prefixes." If the CPN is stored separate from the city code, the mobile device may also modify the number to include the city code in addition to the IDD code and the country code before placing the call.

In another example, assume that the user of the mobile device 12 is operating in the United States when it receives an incoming call from a telephone number associated with the mobile device 33, which is operating in the United Kingdom. Prior to storing the telephone number in the "Received Call" list, the mobile device 12 identifies a number of digits associated with the telephone number, and then, the mobile device 12 determines whether the number of digits exceeds a threshold. Here, since the telephone number is an international number, it includes the country code, the city code, and the CPN. Therefore, the telephone number exceeds the threshold (e.g., 10 digits).

If the number of digits associated with the telephone number of the incoming call exceeds the threshold, the mobile device 12 tags the telephone number as an international number. The mobile device 12 then identifies a reference country from which the international number is originated. To do so, the mobile device 12 may reference a table listing country codes associated with different countries to identify a country code corresponding to the first n digits of the international telephone number. In this example, the mobile device 12 identifies the reference country as United Kingdom. Once the mobile device 12 determines the reference country, the mobile device stores in the "Received Call" list the international number in association with its reference country. The mobile device 12 may modify the received international telephone number before storing. For example, the mobile device 12 may store the international telephone number without the first n digits corresponding to the country code that was matched to the country code of the reference country in the memory space and that is part of the received international number. Additionally, the mobile device 12 may store the international telephone number without the city code. In one specific example, the mobile device 12 may store the CPN in association with but separate from the country code and the city code.

In this way, the international number is stored in a form for non-international call back but with sufficient data to covert to proper form if the call is international at the time of call back. In keeping with the previous example, the next time the user chooses to place a return call to the international number associated with the mobile device 33 by, for example, selecting the number from among the received numbers appearing in the "Received Call" list, the mobile device 12 determines that the number is United Kingdom number. The mobile device 12 then determines its current country of operating. If it is still the United States, the mobile device 12 determines IDD code for the United States and the country code and the city code for the United Kingdom and places the call after prefixing the IDD code for the United States and the country code and the city code for the United Kingdom to the international number.

If, however, the mobile device 12 has roamed outside of the United States to a country other than the United Kingdom, the mobile device 12 determines IDD code for the country of operation and the country code and the city code for the United Kingdom and places the call after prefixing the IDD code for the country of operation and the country code and the city code for the United Kingdom to the selected telephone number. If the mobile device 12 has roamed to the United Kingdom, the mobile device 12 places the call using the number stored in the "Received Call" list without modifying it.

Those skilled in the art presumably are familiar with the structure, programming and operations of the various types of mobile stations. However, for completeness, it may be useful to consider the functional elements/aspects of exemplary mobile stations 12, 13, and 33, at a high-level.

Figure 4:
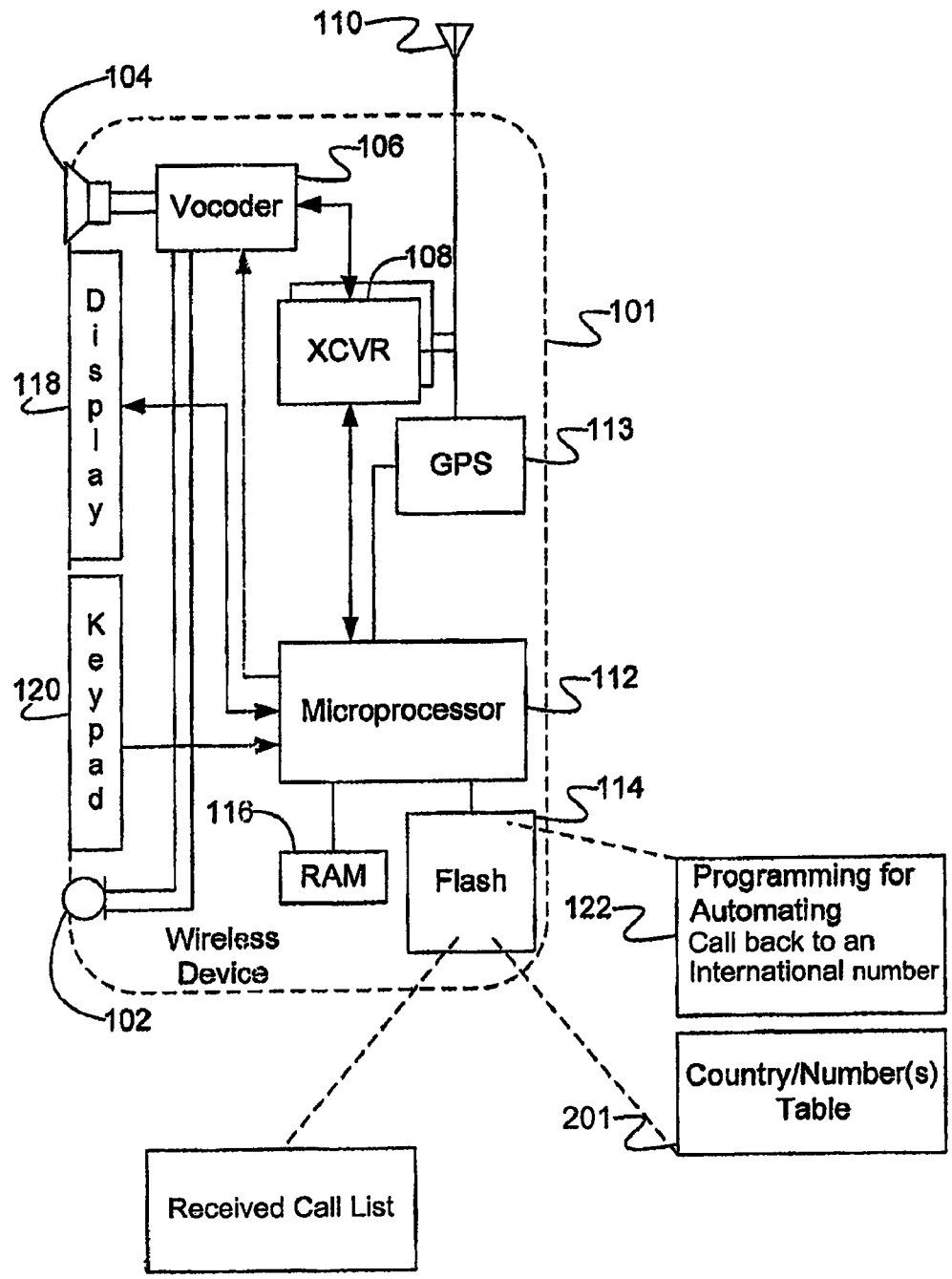
FIG. 4 provides a block diagram illustration of an exemplary wireless device capable of implementing automating calling back to a received international number using one or more of the exemplary techniques discussed herein.

FIG. 4 provides a block diagram illustration of an exemplary wireless device 101, which may be the wireless device 12, 13 or 33 of a customer of any of the network operators. Although the wireless device 101 may be a smart-phone or may be incorporated into another device, such as a portable personal computer, personal digital assistant ("PDA") or the like, for discussion purposes, the illustration shows the wireless device 101 in the form of a handset. The handset embodiment of the wireless device 101 functions as a normal digital wireless telephone station. For that function, the wireless device 101 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the wireless device 101 also includes at least one digital transceiver ("XCVR") 108. The wireless device 101 is a multimode device capable of operations on various technology type networks, such as the networks 10 and 30. For example, the wireless device 101 may utilize either or both of 3GPP2 (1XRTT and EVDO) technologies and 3GPP (LTE/GSM/UMTS) technologies. For that purpose, the XCVR 108 could be a multimode transceiver, or the wireless device 101 may include two or more transceivers each of which supports a subset of the various technologies or modes. The concepts discussed here encompass embodiments of the wireless device 101 utilizing any digital transceivers that conform to current or future developed digital wireless communication standards.

The XCVR 108 provides two-way wireless communication of information, such as vocoded speech samples and/or digital message information, in a selected one of the technology modes. The XCVR 108 also sends and receives a variety of signaling messages in support of the various voice and data services provided via the wireless device 101 and the communication network (described earlier with regard to FIG. 2). Each XCVR 108 connects through RF send and receive amplifiers (not separately shown) to an antenna 110. In the example, the XCVR 108 is configured for RF communication in accord with a digital wireless protocol, such as the current 3GPP2 and 3GPP protocols.

The wireless device 101 includes a display 118 for displaying messages, menus or the like, call related information dialed by the user, calling party numbers, received call numbers. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 101, in that it controls all operations of the wireless device 101 in accord with programming that it executes, for all normal operations, and for operations involved in selecting a preferred technology and selecting an available network of the appropriate technology type, for mobile communications. In the example, the wireless device 101 includes flash type program memory 114, for storage of various "software" or "firmware" program routines and mobile configuration settings, such as mobile directory number ("MDN") and/or mobile identification number ("MIN"), etc. The wireless device 101 may also include a non-volatile random access memory ("RAM") 116 for a working data processing memory. Of course, other storage devices or configurations may be added to or substituted for those in the example.

In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. For example, memory 116 may store the "Received Call" list, listing the CPNs and/or modified CPNs received at the wireless device 101. Programming for the wireless device 101, including programming 122 for automating a call back to a received international call, is stored in the flash type program memory 114. The programming is sometimes referred to as "firmware," is loaded into and executed by the microprocessor 112. The country/numbers tables 201 including IDD codes and country codes of different countries are also stored in flash type program memory 114.

The executable program 122 stored in the flash memory 114 may include a program for enabling the wireless device 101 to tag a number originating from outside of the country of operation as an international number, store the international number in the "Received Call" list, and to place a call back to the international number with automatic modification of the international number if necessary. The wireless device 101 also includes a GPS receiver 113. The GPS receiver 113 may be used to identify the location of the wireless device 101.

As shown by the above discussion, the functionality for assisting a user to store and place a call back to a received number with automated processing for international calls may be implemented on a mobile device in a form programming. An example of the device has been discussed above relative to FIG. 4. The relevant software (programming and/or data) may be downloaded and/or updated from a computer platform, for example, from an OTAF server 29 or the like communicating with the mobile device via the network. Although special purpose devices may be used to support the download and update functions, such devices also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data for assisting a user to store and place a call back to a received international number. The programming code 122 for automating the number storage from incoming calls and associated call back functions is executable by the microprocessor 112 of the mobile device 101, e.g. from storage in the flash memory 114. For downloading and installation, however, the software is stored within the general-purpose computer platform or the like serving as the OTAF system 29.

Figures 5, 6:
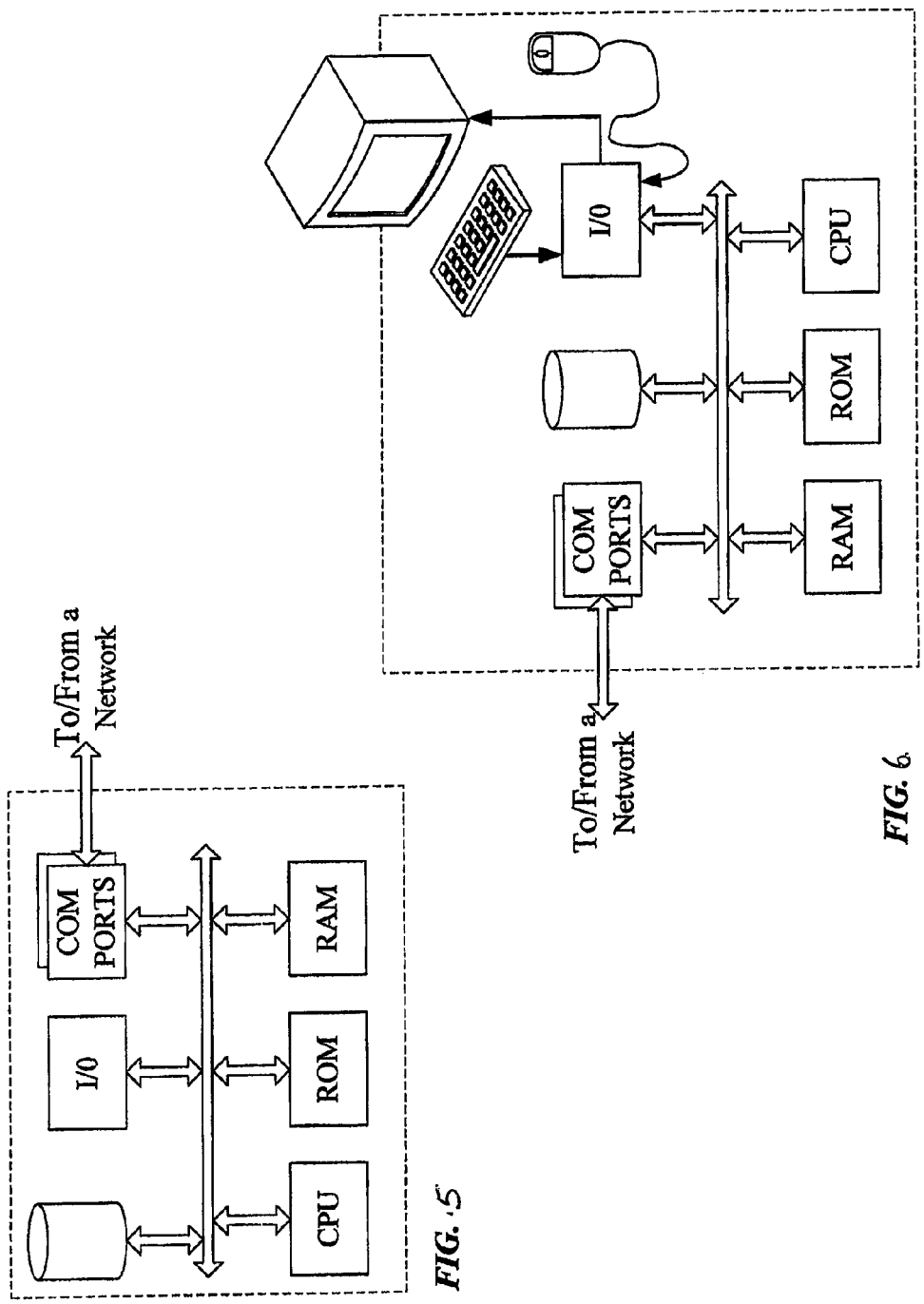
FIG. 5 is a simplified functional block diagram of a computer that may be configured as a host or server.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of for assisting a user to store and place a call back to a received number outlined above may be embodied in programming. Program or software aspects of the technology may be thought of as "products" or "articles of manufacture" typically in the form of executable code and/or associated data that is carried on or embodied in a type of machine readable medium. "Storage" type media include any or all of the memory of the mobile devices, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into the mobile device, for example, from the OTAF server 29 or other computer of the network operator into the mobile device(s) of the operator's customer(s). The table containing IDD codes, country codes, and/or city codes may also be downloaded to the mobile device from the OTAF server 29. The table may also be updated in the mobile device through the OTAF server 29. Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, semiconductor memories of mobile devices, or optical or magnetic disks, such as any of the storage devices in any computer(s) or the like, such as may be used to implement the placement of a call back to a received international number techniques shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for assisting a user to store a received international number, the method comprising steps of:
    receiving, at a mobile device, an incoming call from a telephone number;
    identifying, at the mobile device, a number of digits associated with the telephone number;
    determining, at the mobile device, whether the number of digits exceeds a threshold;
    upon determining that the number of digits exceeds the threshold, identifying the incoming call as an international call and identifying the telephone number as an international telephone number;
    identifying a reference country from which the international call is originated;
    storing, at the mobile device and in a memory space for received call numbers, the international telephone number in association with the reference country;
    receiving, from a user of the mobile device, a selection of a telephone number from among telephone numbers stored in the memory space, the telephone number being the international number;
    identifying a country of operation of the mobile device at the time of receiving the selection from the user;
    determining whether the country of operation is the same as the reference country associated with the international number;
    upon determining that the country of operation is different from the reference country, automatically identifying an IDD code associated with the country of operation;
    automatically modifying the international number to include the identified IDD code; and
    automatically transmitting the modified international number to a wireless network servicing the mobile device in the country of operation.

2. The method of claim 1, wherein determining whether the number of digits exceeds the threshold includes determining whether the number of digits exceeds 10 digits.

3. The method of claim 1, further comprising steps of:
    identifying a country of operation of the mobile device at a time of receiving the international call; and
    determining the number of digits associated with telephone numbers originating from the country of operation,
    wherein the threshold includes the number of digits associated with the numbers originating from the country of operation.

4. The method of claim 3, wherein the country of operation is the United States and the threshold is 10 digits.

5. The method of claim 3, wherein identifying the country of operation includes identifying a country of operation utilizing a Global Positioning System ("GPS").

6. The method of claim 1, wherein identifying the reference country includes:
    referencing a table listing country codes associated with different countries to identify a country code corresponding to the first n digits of the international telephone number, and
    identifying the reference country associated with the country code corresponding to the first n digits of the international telephone number.

7. The method of claim 1, wherein storing the international telephone number includes storing the reference country and the international telephone number without the country code corresponding to the international telephone number in the memory space.

8. The method of claim 7, further comprising steps of:
    receiving, from a user of the mobile device, a second selection of a telephone number from among telephone numbers stored in the memory space, the telephone number being the international number;
    identifying a second country of operation of the mobile device at the time of receiving the second selection from the user;
    determining whether the second country of operation is the same as the reference country associated with the international number; and
    upon determining that the second country of operation is the same as the reference country, automatically transmitting the international number as stored in the memory to a wireless network servicing the mobile device in the country of operation.

9. The method of claim 1, further comprising steps of:
    receiving, at the mobile device, another incoming call from another telephone number;
    identifying, at the mobile device, a number of digits associated with the other telephone number;
    determining, at the mobile device, whether the number of digits associated with the other telephone number exceeds a threshold;
    upon determining that the number of digits associated with the other telephone number does not exceed the threshold, identifying the other incoming call as an intra-national call and the other telephone number as an intra-national telephone number;

identifying a country of operation of the mobile device at the time of receiving the intra-national incoming call; and storing, at the mobile device and in the memory space for received call numbers, the intra-national telephone number in association with the country of operation as a reference country from which the intra-national call originates.

10. An article of manufacture comprising a machine-readable storage medium and a program for causing a mobile device to assist a user to store a received international number, the program being embodied on, the machine-readable storage medium and including instructions that, when executed, cause the mobile device to:

receive, at a mobile device, an incoming call from a telephone number;

identify, at the mobile device, a number of digits associated with the telephone number;

determine, at the mobile device, whether the number of digits exceeds a threshold;

upon determining that the number of digits exceeds the threshold, identify the incoming call as an international call and identify the telephone number as an international telephone number;

identify a reference country from which the international call is originated;

store, at the mobile device and in a memory space for received call numbers, the international telephone number in association with the reference country;

receive, from a user of the mobile device, a selection of a telephone number from among telephone numbers stored in the memory space, the telephone number being the international number;

identify a country of operation of the mobile device at the time of receiving the selection from the user;

determine whether the country of operation is the same as the reference country associated with the international number;

upon determining that the country of operation is different from the reference country, automatically identify an IDD code associated with the country of operation;

automatically modify the international number to include the identified IDD code; and automatically transmit the modified international number to a wireless network servicing the mobile device in the country of operation.

11. The article of manufacture of claim 10, wherein the threshold is 10 digits.

12. The article of manufacture of claim 10, wherein to identify the reference country, the program includes instructions for causing the mobile device to:

reference a table listing country codes associated with different countries to identify a country code corresponding to the first n digits of the international telephone number, and identify the reference country associated with the country code corresponding to the first n digits of the international telephone number.

13. The article of manufacture of claim 10, wherein to store the international telephone number, the program includes instructions for causing the mobile device to store the reference country and the international telephone number without the country code corresponding to the international telephone number in the memory space.

14. The article of manufacture of claim 13, wherein the program further includes instructions for causing the mobile device to:

receive, from a user of the mobile device, a second selection of a telephone number from among telephone numbers stored in the memory space, the telephone number being the international number;

identify a second country of operation of the mobile device at the time of receiving the second selection from the user;

determine whether the second country of operation is the same as the reference country associated with the international number; and upon determining that the second country of operation is the same as the reference country, automatically transmit the international number as stored in the memory to a wireless network servicing the mobile device in the country of operation.

15. A mobile device configured to assist a user to store a received international number, the mobile device comprising:

a processing device; and a memory storing executable instructions for causing the processing device to:

receive, at the mobile device, an incoming call from a telephone number;

identify, at the mobile device, a number of digits associated with the telephone number;

determine, at the mobile device, whether the number of digits exceeds a threshold;

upon determining that the number of digits exceeds the threshold, identify the incoming call as an international call and identify the telephone number as an international telephone number;

identify a reference country from which the international call is originated;

store, at the mobile device and in a memory space for received call numbers, the international telephone number in association with the reference country;

receive, from a user of the mobile device, a selection of a telephone number from among telephone numbers stored in the memory space, the telephone number being the international number;

identify a country of operation of the mobile device at the time of receiving the selection from the user;

determine whether the country of operation is the same as the reference country associated with the international number;

upon determining that the country of operation is different from the reference country, automatically identify an IDD code associated with the country of operation;

automatically modify the international number to include the identified IDD code; and automatically transmit the modified international number to a wireless network servicing the mobile device in the country of operation.

16. The mobile device of claim 15, wherein the threshold is 10 digits.

17. The mobile device of claim 15, wherein to identify the reference country, the memory stores executable instructions for causing the processing device to:

reference a table listing country codes associated with different countries to identify a country code corresponding to the first n digits of the international telephone number, and identify the reference country associated with the country code corresponding to the first n digits of the international telephone number.

18. The mobile device of claim 15, wherein to store the international telephone number, the memory stores executable instructions for causing the processing device to store the reference country and the international telephone number without the country code corresponding to the international telephone number in the memory space.

19. The method of claim 6, wherein the table is downloaded to the mobile device via an Over-The-Air service activation/provisioning Function ("OTAF") server and is updated in the mobile device via the OTAF server.

* * * * *